(12) United States Patent
Suzuki et al.

(10) Patent No.: US 11,994,217 B2
(45) Date of Patent: May 28, 2024

(54) SLIDING COMPONENT

(71) Applicant: Eagle Industry Co., Ltd., Tokyo (JP)

(72) Inventors: Hiroshi Suzuki, Tokyo (JP); Yuichiro Tokunaga, Tokyo (JP)

(73) Assignee: EAGLE INDUSTRY CO., LTD., Tokyo (JP)

(*) Notice: Subject to any disclaimer, the term of this patent is extended or adjusted under 35 U.S.C. 154(b) by 0 days.

(21) Appl. No.: 17/908,700

(22) PCT Filed: Apr. 7, 2020

(86) PCT No.: PCT/JP2020/015744
§ 371 (c)(1),
(2) Date: Sep. 1, 2022

(87) PCT Pub. No.: WO2021/205556
PCT Pub. Date: Oct. 14, 2021

(65) Prior Publication Data
US 2023/0160476 A1  May 25, 2023

(51) Int. Cl.
*F16J 15/34* (2006.01)
(52) U.S. Cl.
CPC .................. *F16J 15/3412* (2013.01)
(58) Field of Classification Search
CPC .... F16J 15/00; F16J 15/16; F16J 15/50; F16J 15/52; F16J 15/34; F16J 15/3404; F16J 15/3408; F16J 15/3412; F16J 15/3416; F16J 15/342; F16J 15/3424
USPC ........................................................ 277/399
See application file for complete search history.

(56) References Cited

U.S. PATENT DOCUMENTS

| 2003/0189294 A1 | 10/2003 | Tejima |
| 2005/0212217 A1* | 9/2005 | Tejima ................ F16J 15/3412 277/399 |
| 2011/0215531 A1* | 9/2011 | Tokunaga ............ F16J 15/34 277/399 |

(Continued)

FOREIGN PATENT DOCUMENTS

| CN | 104154235 A | 11/2014 |
| DE | 7920187 U1 | 1/1983 |

(Continued)

OTHER PUBLICATIONS

International Search Reported dated Jun. 16, 2020, Application No. PCT/JP2020/015744; English translation included, 4 pages.

(Continued)

*Primary Examiner* — Nathan Cumar
(74) *Attorney, Agent, or Firm* — Rankin, Hill & Clark LLP

(57) ABSTRACT

A sliding component includes a pair of the sliding members being slidable relative to each other on sliding surfaces of the sliding members. One of the sliding surfaces includes a dimple group in which a plurality of dimples is arranged and each of the dimples has an opening portion whose shape has a long axis and a short axis orthogonal to the long axis. The dimple group includes a clockwise dimple group in which the dimples are arranged in a clockwise direction from an inner diameter side to an outer diameter side of the sliding surface and a counterclockwise dimple group in which the dimples are arranged in a counterclockwise direction from the inner diameter side to the outer diameter side of the one of the sliding surfaces.

9 Claims, 6 Drawing Sheets

(56) References Cited

U.S. PATENT DOCUMENTS

2011/0233872 A1* 9/2011 Iguchi ................. F16J 15/3424
    277/400

FOREIGN PATENT DOCUMENTS

| JP | 2004-3578 | A | 1/2004 |
| JP | 2004-60738 | A | 2/2004 |
| JP | 2005-180652 | A | 7/2005 |
| JP | 2010-133496 | A | 6/2010 |
| JP | 5456772 | B2 | 4/2014 |

OTHER PUBLICATIONS

Written Opinion of the International Searching Authority dated Jun. 16, 2020, Application No. PCT/JP2020/015744, 4 pages.
Japanese Office Action dated Jun. 6, 2023 issued in corresponding Japanese application No. 2022-513758; Partial English translation included (14 pages).
Extended European Search Report dated Sep. 14, 2023 issued in corresponding European application No. 20930454.2; English text (7 pages).

\* cited by examiner

SLIDING COMPONENT

TECHNICAL FIELD

The present invention relates to a pair of sliding components that slide relative to each other by sliding surfaces, for example, a mechanical seal, a sliding bearing, and other sliding components suitable for a sliding portion. In particular, the present invention relates to a sliding component including a sealing ring or a bearing that is required to have fluid interposing between sliding surfaces to reduce friction and prevent fluid from leaking from the sliding surfaces.

BACKGROUND ART

As a sealing device configured to prevent leakage of sealed fluid, there is known a sealing device (for example, a mechanical seal) including a pair of sliding components that relatively slide on sliding surfaces. In such a sealing device, it is necessary to maintain favorable sealing performance while reducing sliding torque by forming a fluid lubrication film by the sealed fluid between the sliding surfaces. As one method for achieving favorable sealing performance and low sliding torque, there is known a technique of arranging a plurality of dimples in a sliding surface.

For example, it is known that favorable sealing performance and low sliding torque may be achieved by arranging dimples each including a circular opening portion in a sliding surface on a virtual circumference line having a center coincide with a rotation center of a sliding component. (For example, see Patent Literature 1).

In addition, it is also known that dimples each including an elongated rectangular opening portion whose end portion is semicircular are arranged at a predetermined dimple angle θ, and a ratio L1/L2 of a dimple circumferential length L1 on a circle passing through a dimple center to a circumferential length L2 of a land portion between adjacent dimples on the same circle is set to 0.001≤L1/L2≤0.1, thereby optimally adjusting sealing performance and sliding torque of the dimples as a whole (see, for example, Patent Literature 2).

CITATION LIST

Patent Literature

Patent Literature 1: JP-A-2010-133496
Patent Literature 2: Japanese Patent No. 5456772

SUMMARY OF INVENTION

Technical Problem

According to the technique of Patent Literature 1, even though favorable sealing performance and low sliding torque may be achieved under specific operating conditions, the favorable sealing performance and low sliding torque cannot be achieved in a wide rotation speed range.

In addition, according to the technique of Patent Literature 2, since the dimple angle is fixed, even though leakage of sealed fluid and sliding torque may be reduced under specific operating conditions, favorable sealing performance and low sliding torque cannot be achieved in a wide rotation speed range. In particular, when used in reverse rotation, there is a tendency that the sealing performance is lowered and the sliding torque is increased.

An object of the present invention is, in a pair of sliding components that relatively slide on sliding surfaces, to provide the sliding components capable of achieving favorable sealing performance and low sliding torque regardless of a rotation direction and when used in a wide rotation speed range.

Solution to Problem

In order to solve the above problem, a sliding component of the present invention is:

a pair of sliding members slidable relative to each other on sliding surfaces of the sliding members.

At least one of the sliding surfaces includes a dimple group in which a plurality of dimples is arranged, each of the dimples having an opening portion whose shape has of a long axis and a short axis orthogonal to the long axis, and the dimple group includes: a clockwise dimple group in which the dimples are arranged in a clockwise direction from an inner diameter side to an outer diameter side of the sliding surface; and a counterclockwise dimple group in which the dimples are arranged in a counterclockwise direction from the inner diameter side to the outer diameter side of the sliding surface.

According to this feature, since the clockwise dimple group from the inner diameter side to the outer diameter side of the sliding surface and the counterclockwise dimple group from the inner diameter side to the outer diameter side are included, favorable sealing performance and low sliding torque may be exhibited regardless of rotation directions.

The sliding component according to the present invention is characterized in that the clockwise dimple group includes a first dimple group in which the long axes of the dimples are aligned, and the counterclockwise dimple group includes a second dimple group in which the long axes of the dimples are aligned.

According to this feature, since the long axes of the dimples are aligned respectively in the first dimple group of the clockwise dimple group and the second dimple group of the counterclockwise dimple group, strength of suction effect and dynamic pressure effect of the dimples may be easily adjusted, and thus the dimple group as a whole may exhibit favorable sealing performance and low sliding torque over a wide rotation speed range.

The sliding component according to the present invention is characterized in that the clockwise dimple group further includes a third dimple group in which the short axes of the dimples constituting the second dimple group are aligned, and the counterclockwise dimple group further includes a fourth dimple group in which the short axes of the dimples constituting the first dimple group are aligned.

According to this feature, since the clockwise dimple group further includes the third dimple group in which the short axes are aligned while the counterclockwise dimple group further includes the fourth dimple group in which the short axes are aligned, the strength of the suction effect and the dynamic pressure effect may be easily adjusted by combining the first dimple group to the fourth dimple group having different characteristics, and thus the dimple group as a whole may exhibit favorable sealing performance and low sliding torque over a wide rotation speed range.

The sliding component according to the present invention is characterized in that
the dimples constituting the first dimple group and the dimples constituting the second dimple group have different depths.

According to this feature, since the dimples constituting the first dimple group and the dimples constituting the second dimple group have different depths, the strength of the suction effect and the dynamic pressure effect of the first dimple group to the fourth dimple group may be easily changed, and thus the dimple group as a whole may exhibit favorable sealing performance and low sliding torque in a wide rotation speed range.

The sliding component according to the present invention is characterized in that
the first dimple group forms a curve that is convex outward in a radial direction of the sliding surface, and the second dimple group forms a curve that is convex outward in the radial direction of the sliding surface.

According to this feature, since the dimples are arranged along the curves, angles of the dimples may be gradually changed, and thus the dimple group as a whole may exhibited favorable sealing performance and low sliding torque in a wide rotation speed range.

The sliding component according to the present invention is characterized in that
the shape of each of the opening portions of the dimple is an ellipse.

According to this feature, even though the dimples having the elliptical opening portions are ellipses having the same shape and size, the suction effect and the dynamic pressure effect may be improved by changing inclination of the long axis of each dimple, and thus favorable sealing performance and low sliding torque may be achieved in a wide rotation speed range by arranging the dimple while changing the inclination of the long axis of the dimple.

DESCRIPTION OF EMBODIMENTS

Hereinafter, modes for carrying out the present invention will be exemplified based on embodiments with reference to the drawings. However, unless otherwise specified, dimensions, materials, shapes, relative positions, and the like of components described in the embodiments are not intended to limit the scope of the present invention.

Embodiment 1

A sliding component according to Embodiment 1 of the present invention will be described with reference to FIGS. 1 and 2. In the following embodiment, a mechanical seal, which is an example of a sliding component, will be described as an example. However, the present invention is not limited thereto, and for example, the present invention may be used as a sliding component of a bearing that slides on a rotation shaft while sealing lubricating oil on one side in an axial direction of a cylindrical sliding surface. An outer peripheral side of the sliding component constituting the mechanical seal will be described as a sealed fluid side (a high-pressure fluid side), and an inner peripheral side will be described as a leakage side (a low-pressure fluid side, for example, an atmosphere side).

Figure 1:
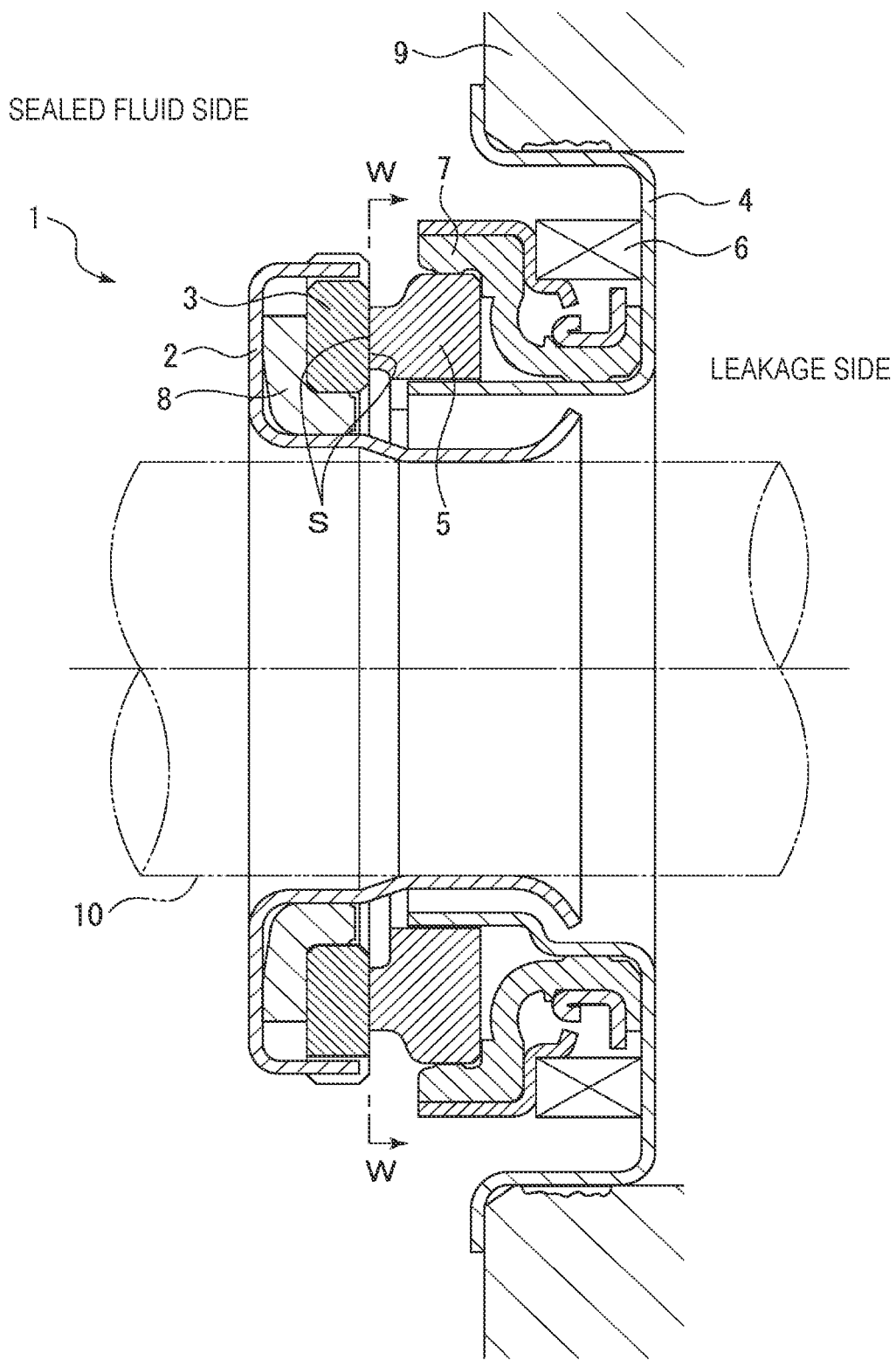
FIG. 1 is a vertical cross-sectional view showing an example in which a sliding component according to the present invention is applied to a mechanical seal.

FIG. 1 is a vertical cross-sectional view showing an example of a mechanical seal 1, which belongs to an inside type in which sealed fluid leaking from an outer periphery of a sliding surface S toward an inner peripheral direction is sealed, and includes a rotation-side cartridge and a fixed-side cartridge. The rotation-side cartridge includes a sleeve 2 fitted to a rotation shaft 10, an annular rotation-side sealing ring 3 that is one sliding component, and a packing 8 that seals space between the sleeve 2 and the rotation-side sealing ring 3. The rotation-side cartridge rotates together with the rotation shaft 10.

The fixed-side cartridge includes a housing 4 attached to a casing 9, an annular fixed-side sealing ring 5 that is another sliding component, a bellows 7 that seals space between the fixed-side sealing ring 5 and the housing 4, and a coiled wave spring 6 that urges the fixed-side sealing ring 5 toward the rotation-side sealing ring 3 via the bellows 7. The housing 4 is fixed to the casing 9 in a rotation direction and an axial direction.

In the mechanical seal 1 having the above configuration, the sliding surface S of the rotation-side sealing ring 3 and the sliding surface S of the fixed-side sealing ring 5 slide relative to each other so as to prevent the sealed fluid from flowing out from the outer peripheral side to the inner peripheral side. Although FIG. 1 shows a case where a width of the sliding surface of the rotation-side sealing ring 3 is wider than a width of the sliding surface of the fixed-side sealing ring 5, the present invention is not limited thereto, and it is needless to say that the present invention may also be applied in an opposite case.

Materials of the rotation-side sealing ring 3 and the fixed-side sealing ring 5 are selected from silicon carbide (SiC) that has good wear resistance, carbon that has good self-lubricating performance, and the like. For example, both of the rotation-side sealing ring 3 and the fixed-side sealing ring 5 may be made of SiC, or the rotation-side sealing ring 3 may be made of SiC while the fixed-side sealing ring 5 is made of carbon.

Figure 2:
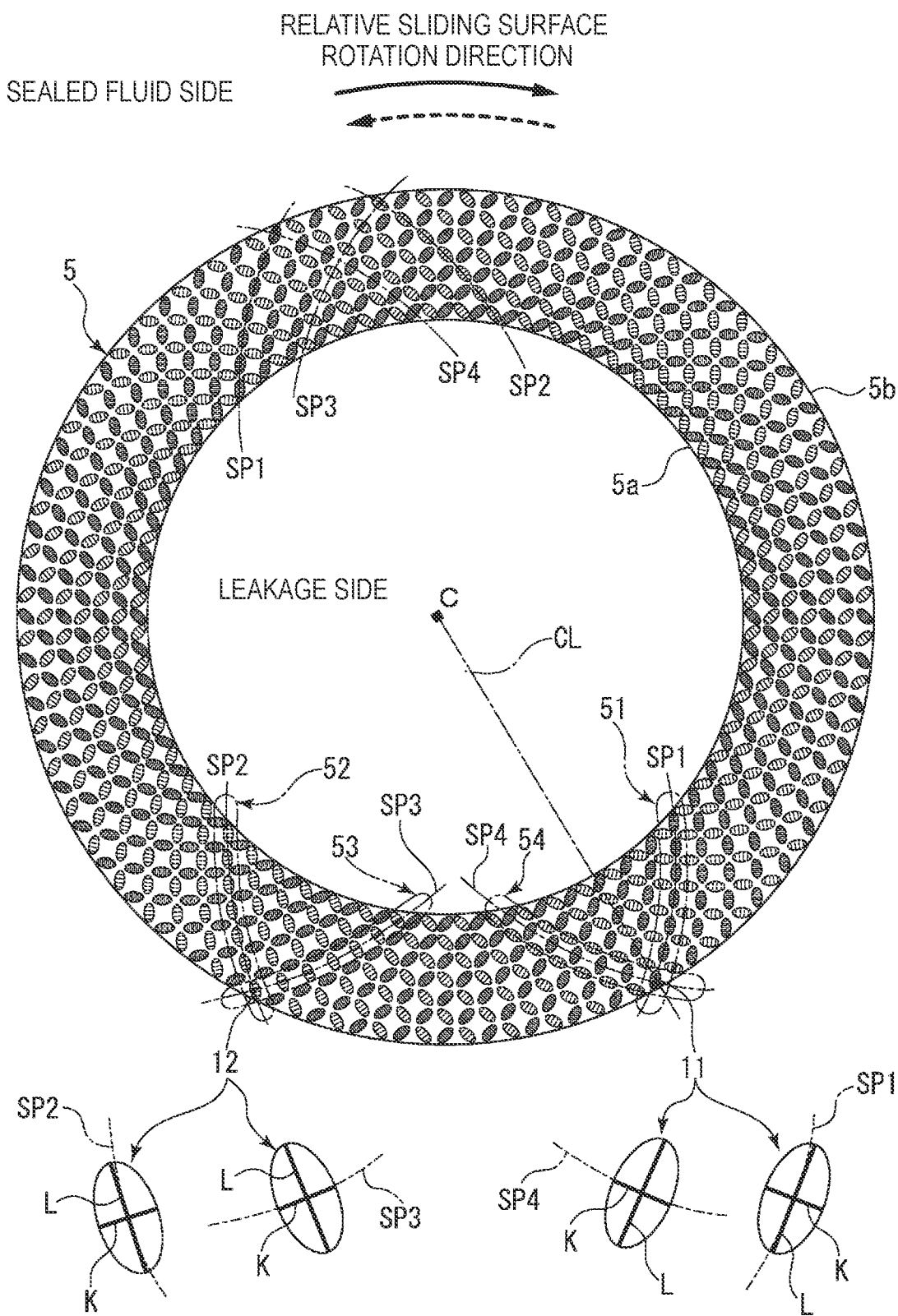
FIG. 2 is taken along line W-W of FIG. 1, which shows an example of a sliding surface of a sliding component according to Embodiment 1 of the present invention.

As shown in FIG. 2, on the sliding surface S of the fixed-side sealing ring 5, clockwise dimple groups 51 and 53 and counterclockwise dimple groups 52 and 54 are formed. Dimples 11 and 12 have substantially the same size and depth. The dimple groups 51 and 54 include a plurality of the dimples 11, and the dimple groups 52 and 53 include a plurality of the dimples 12. Each of the dimple groups 51, 52, 53, and 54 includes the same number of dimples.

In the present invention, each of the dimples 11 and 12 is a recess that includes an opening portion surrounded by the flat sliding surface S and a bottom portion that is recessed relative to the sliding surface S. Each of opening portions of the dimples has a shape having a long axis L and a short axis K orthogonal to each other. In addition, the dimples 11 and 12 are spaced apart from each other with land portions interposed therebetween. In the present invention, the long axis is an imaginary straight line that passes through a centroid of the shape of each opening portion and connects maximum width portions of the opening portion. In addition, the short axis is an imaginary straight line that passes through the long axis and is orthogonal to the long axis to connect the opening portion. In the present embodiment, as an example, each of the opening portions of the dimples 11 and 12 is an ellipse having the long axis L and the short axis K orthogonal to each other. However, the shape is not limited to an ellipse, and may also be an oval shape, a rhombus shape, a polygonal shape, or any shape formed by closed curves 91, 92, 93, or 94 as shown in FIGS. 6A to 6D, as long as the shape has the long axis L and the short axis K orthogonal to each other.

As shown in FIG. 2, the dimple group 51 is formed by arranging the long axis L of each dimple 11 in contact with an imaginary spiral SP1, and a predetermined number (7 in the example of FIG. 2) of the dimples 11 are arranged at equal intervals along the spiral SP1 in a clockwise direction from an inner diameter side to an outer diameter side of the sliding surface S. The dimple group 53 is arranged such that the short axis K of each dimple 12 is in contact with an imaginary spiral SP3, and the same number of dimples 12 as the number of the dimples 11 are arranged at equal intervals along the spiral SP3 in the clockwise direction from the inner diameter side to the outer diameter side of the sliding surface S. The dimple group 51 and the dimple group 53 are alternately arranged on the sliding surface S at equal intervals in a circumferential direction in a staggered arrangement. Here, the staggered arrangement refers to an arrangement in which the long axes L of the dimples 12 whose short axes K are aligned is located between one dimple 11 and another dimple 11 whose long axes L are aligned when the dimple group 51 and the dimple group 53 are arranged adjacent to each other in the circumferential direction. In addition, the dimple group 52 is formed by arranging the long axis L of each dimple 12 in contact with an imaginary spiral SP2 extending in a counterclockwise direction from the inner diameter side to the outer diameter side of the sliding surface S. The dimple group 54 is formed by arranging the short axis K of each dimple 11 in contact with an imaginary spiral SP4 extending in the counterclockwise direction from the inner diameter side to the outer diameter side of the sliding surface S. The long axis L of each dimple 11 is formed to be in contact with the imaginary spiral SP1, the short axis K of each dimple 11 is formed to be in contact with the imaginary spiral SP4, the long axis L of each dimple 12 is formed to be in contact with the imaginary spiral SP2, and the short axis K of each dimple 12 is formed to be in contact with the imaginary spiral SP3. On the sliding surface S, the clockwise dimple group 51 and the clockwise dimple group 53 are alternately arranged in the circumferential direction. The counterclockwise dimple group 52 and the counterclockwise dimple group 54 are alternately arranged in the circumferential direction.

The number of the dimples 11 constituting the clockwise dimple group 51 are the same as the number of the dimples 11 constituting the counterclockwise dimple group 54, and such dimples are symmetrical relative to a radial axis passing through the middle between the dimple group 51 and the dimple group 54. In addition, the number of the dimples 12 constituting the counterclockwise dimple group 52 and the number of the dimples 12 constituting the clockwise dimple group 53 are the same, and such dimples are symmetrical to a radial axis passing through the middle between the dimple group 52 and the dimple group 53.

Functions of the dimples 11 and 12 will be described. When the rotation-side sealing ring 3 rotates in the clockwise direction, fluid between the sliding surfaces S and fluid in the dimples 11 and 12 are moved following a moving direction of the rotation-side sealing ring 3 due to viscosity of the fluid. Since a flow path of the fluid flowing into the dimples 11 and 12 rapidly expands, negative pressure is generated on an upstream side of the dimples 11 and 12, and thus cavitation occurs. However, since a magnitude of the negative pressure in the cavitation is limited by a value of fluid vapor pressure, the negative pressure does not become large. In addition, on a downstream side of the dimples 11 and 12, positive pressure is generated by a wedge effect (dynamic pressure effect) due to rapid contraction of a flow path. Due to the negative pressure generated on the upstream side of the dimples 11 and 12, the dimples 11 and 12 exhibit a suction effect of suctioning surrounding fluid. On the other hand, since the positive pressure generated on the downstream side of the dimples 11 and 12 is larger than the negative pressure in the cavitation, the dimples 11 and 12 as a whole has positive pressure. Due to the positive pressure generated by the plurality of dimples 11 and 12 arranged on the sliding surface S, space between the sliding surfaces S is expanded, and thus the fluid flows onto the sliding surface S to exert a lubricating function.

Next, functions of the dimple groups 51, 52, 53, and 54 will be described. When the rotation-side sealing ring 3 rotates in the clockwise direction, the dimples 11 and 12, which are located in the vicinity of a leakage-side peripheral edge 5a, of the clockwise dimple groups 51 and 53 exhibit a pumping function of suctioning fluid from the leakage side. In addition, since suction and discharge are continuously repeated between the adjacent dimples 11 and 12 while the fluid gradually moves from the leakage side to the sealed fluid side, leakage may be extremely reduced. Further, since high-pressure fluid is supplied to the sliding surface S by the dynamic pressure effect of the dimples 11 and 12, the sliding surface S is maintained in a fluid lubricating state, and thus sliding torque may be reduced.

In addition, the clockwise dimple group 51 is arranged along the spiral SP1 by aligning the long axes 1, of the dimples 11, whereas the clockwise dimple group 53 is arranged along the spiral SP3 by aligning the short axes K of the dimples 12. As a result, even though both of the dimple groups 51 and 53 are clockwise dimple groups, pumping effects and fluid lubricating effects thereof are different to each other. Specifically, since a dynamic pressure generating effect is improved in the clockwise dimple group 51 that is disposed along the spiral SP1 by aligning the long axes L of the dimples 11, the fluid lubricating function is exhibited even at low rotation speed. On the other hand, since the clockwise dimple group 53 that is disposed along the spiral SP3 by aligning the short axes K of the dimples 12 has a favorable suction effect, the pumping function may be exhibited even at low rotation speed. As a result, even when operating in a wide rotation speed range, functions of the clockwise dimple groups 51 and 53 complement each other, and thus favorable fluid lubricating function and sealing function may be exhibited.

On the other hand, when the rotation-side sealing ring 3 rotates in the counterclockwise direction, the dimples 11 and 12, which are located in the vicinity of the leakage-side peripheral edge 5a, of the counterclockwise dimple groups 52 and 54 exhibit the pumping function of suctioning fluid from the leakage side. In addition, since suction and discharge are continuously repeated between the adjacent dimples 11 and 12 while the fluid gradually moves from the leakage side to the sealed fluid side, leakage may be extremely reduced. Further, since high-pressure fluid is supplied to the sliding surface S by the dynamic pressure effect of the dimples 11 and 12, the sliding surface S is maintained in a fluid lubricating state, and thus sliding torque may be reduced.

In addition, the counterclockwise dimple group 52 is arranged along the spiral SP2 by aligning the long axes L of the dimples 12 to each other, whereas the counterclockwise dimple group 54 is arranged along the spiral SP4 by aligning the short axes K of the dimples 11 to each other. As a result, even though the dimple groups 52 and 54 are all counterclockwise dimple groups, pumping effects and fluid lubricating effects thereof are different. Specifically, since a dynamic pressure generating effect is improved in the counterclockwise dimple group 52 that is disposed along the spiral SP2 by aligning the long axes L of the dimples 12, the fluid lubricating function is exhibited even at low rotation speed. On the other hand, since the counterclockwise dimple group 54 that is disposed along the spiral SP4 by aligning the short axes K of the dimples 11 has a favorable suction effect, the pumping function may be exhibited even at low rotation speed. As a result, even when operating in a wide rotation speed range, functions of the counterclockwise dimple groups 52 and 54 complement each other, and thus favorable fluid lubricating function and sealing function may be exhibited.

In this way, the clockwise dimple group 51 and the counterclockwise dimple group 54, and the counterclockwise dimple group 52 and the clockwise dimple group 53 are provided symmetrically relative to the radial direction, and thus high sealing performance and low sliding torque may be exhibited regardless of rotation directions since the clockwise dimple groups and the counterclockwise dimple groups are included.

Although the embodiments of the present invention have been described above with reference to the drawings, the specific configuration is not limited to these embodiments, and changes and additions without departing from the spirit of the present invention are also included in the present invention.

Although the shapes and the sizes of the dimples 11 and 12 are substantially the same in the above embodiment, the present invention is not limited thereto. For example, the clockwise dimple groups 51 and 53 and the counterclockwise dimple groups 52 and 54 may be constituted by the dimples 11 and the dimples 12 having different depths. Since the fluid holding effect of holding the fluid in the dimples, the suction effect, and the dynamic pressure effect may be changed by changing the depths of the dimples, favorable sealing performance and low sliding torque may be exhibited even at a wider rotation speed range by arranging the dimples having the different depths.

In addition, although the dimple groups 51, 52, 53, and 54 are provided with the dimples 11 and 12 along the spirals, curves that extend clockwise or counterclockwise from the inner diameter side toward the outer diameter side of the sliding surface S and are convex outward in the radial direction such as circular arcs, parabolas, sine waves, or trochoid curves, or straight lines may be formed instead of the spirals. In addition, a combination of curves and straight lines may also be formed.

Embodiment 2

Figure 3:
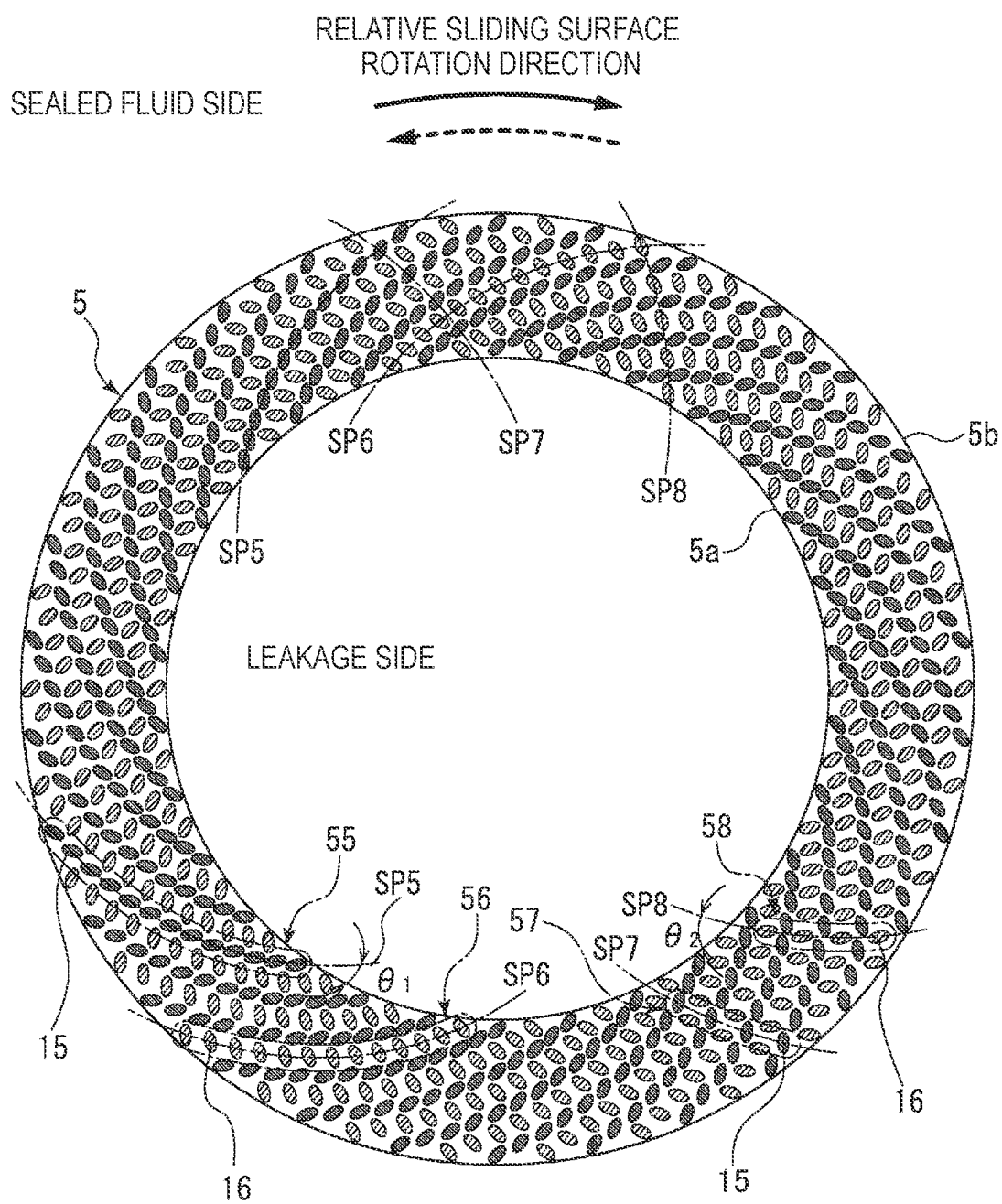
FIG. 3 is taken along line W-W of FIG. 1, which shows an example of a sliding surface of a sliding component according to Embodiment 2 of the present invention.

A sliding component according to Embodiment 2 of the present invention will be described. FIG. 3 shows the sliding surface S of the sliding component according to Embodiment 2 in which the number of dimples 15 and 16 constituting clockwise dimple groups 55 and 56 and the number of the dimples 15 and 16 constituting counterclockwise dimple groups 57 and 58 are different, which is different from Embodiment 1. Other configurations are the same as those of Embodiment 1. Hereinafter, the same members and configurations as those of Embodiment 1 will be denoted by the same reference numerals, and redundant description thereof will be omitted.

As shown in FIG. 3, the sliding surface S of the fixed-side sealing ring 5 is provided with a plurality of the clockwise dimple groups 55 and 56 in which the dimples 15 and 16 are arranged in the clockwise direction from the inner diameter side to the outer diameter side of the sliding surface 5, and a plurality of the counterclockwise dimple groups 57 and 58 in which the dimples 15 and 16 are arranged in the counterclockwise direction from the inner diameter side to the outer diameter side of the sliding surface S.

As shown in FIG. 3, the clockwise dimple group 55 is arranged such that the long axis L of each dimple 15 is arranged at a predetermined angle along an imaginary spiral SP5, and a predetermined number (13 in the example of FIG. 3) of the dimples 15 are arranged at equal intervals along the spiral SP5 in the clockwise direction from the inner diameter side to the outer diameter side of the sliding surface S. The clockwise dimple group 56 is arranged such that the short axis K of each dimple 16 is arranged at a predetermined angle along the imaginary spiral SP56 extending in the clockwise direction from the inner diameter side to the outer diameter side of the sliding surface S. The counterclockwise dimple group 57 is arranged such that the short axis K of each dimple 15 is arranged at a predetermined angle along an imaginary spiral SP7, and a predetermined number (4 in the example of FIG. 3) of the dimple 15 are arranged along the spiral SP7 in the counterclockwise direction from the inner diameter side to the outer diameter side of the sliding surface S. The counterclockwise dimple group 58 is arranged such that the long axis L of each dimple 16 is arranged at a predetermined angle along an imaginary spiral SP8 extending in the counterclockwise direction from the inner diameter side to the outer diameter side of the sliding surface S. On the sliding surface S, the clockwise dimple group 55 and the clockwise dimple group 56 are alternately arranged in the circumferential direction. The counterclockwise dimple group 57 and the counterclockwise dimple group 58 are alternately arranged in the circumferential direction.

When the rotation-side sealing ring 3 rotates in the clockwise direction, the clockwise dimple groups 55 and 56 exhibit a sealing function and a fluid lubricating function, and thus leakage and sliding torque may be reduced. On the other hand, when the rotation-side sealing ring 3 rotates in the counterclockwise direction, the counterclockwise dimple groups 57 and 58 exhibit the sealing function and the fluid lubricating function, and thus leakage and sliding torque may be reduced.

Since the number of the dimples 15 and 16 constituting the clockwise dimple groups 55 and 56 is larger than the number of the dimples 15 and 16 constituting the counterclockwise dimple groups 57 and 58, the sealing function and the fluid lubricating function during clockwise rotation may be improved. In addition, since an angle θ1 formed by the spiral SP5, the spiral SP6, and the leakage-side peripheral edge 5a is smaller than an angle θ2 formed by the spiral SP7, the spiral SP8, and the leakage-side peripheral edge 5a, the clockwise dimple groups 55 and 56 may exhibit a pumping effect from low rotation speed during clockwise rotation, which is particularly effective in a case where an operating rotation speed range during clockwise rotation reaches low-speed rotation.

According to the sliding component of Embodiment 1, the number of the dimples 11 and 12 constituting the clockwise dimple groups 51 and 53 are the same as the number of the dimples 11 and 12 constituting the counterclockwise dimple groups 52 and 54, and therefore, the same sealing function and fluid lubricating function are exhibited during clockwise rotation and counterclockwise rotation. On the other hand, according to the sliding component according to Embodiment 2, the number of the dimples 15 and 16 constituting the clockwise dimple groups 55 and 56 is larger than the number of the dimples 15 and 16 constituting the counterclockwise dimple groups 57 and 58, and therefore, the sealing function and the fluid lubricating function may be improved during clockwise rotation as compared with counterclockwise rotation. In addition, since the angle θ1 of the spiral SP5, the spiral SP6, and the leakage-side peripheral edge 5a is smaller than the angle θ2 of the spiral SP7, the spiral SP8, and the leakage-side peripheral edge 5a, the clockwise dimple groups 55 and 56 may exhibit the pumping effect from lower rotation speed as compared with the counterclockwise dimple groups 57 and 58.

Embodiment 3

Figure 4:
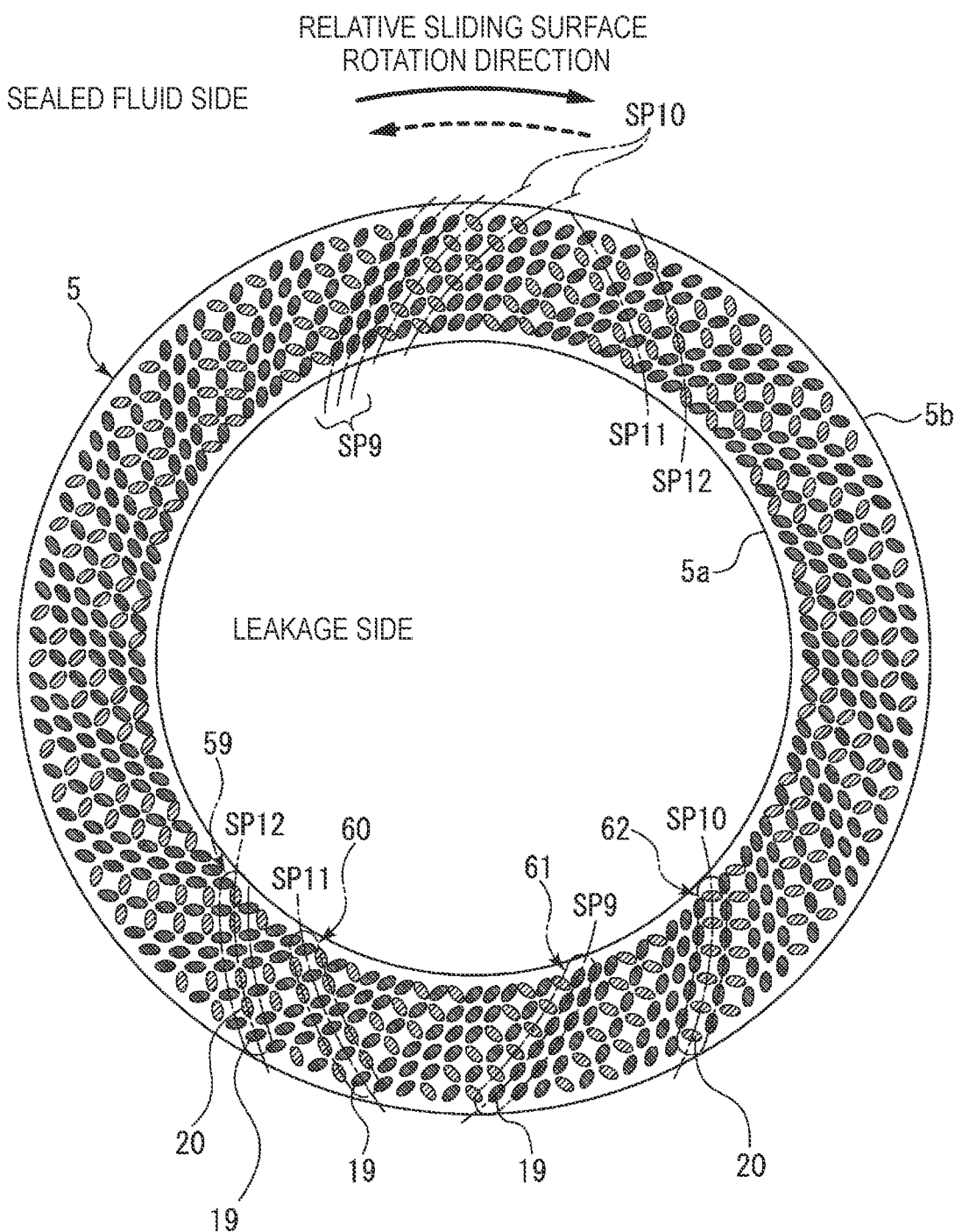
FIG. 4 is taken along line W-W of FIG. 1, which shows an example of a sliding surface of a sliding component according to Embodiment 3 of the present invention.

A sliding component according to Embodiment 3 of the present invention will be described. FIG. 4 shows the sliding surface S of a sliding component according to Embodiment 3. In Embodiment 1, the same number of the clockwise dimple groups 51 and the clockwise dimple groups 53 are alternately arranged in the circumferential direction. However, the number of clockwise dimple groups 61 and the number of clockwise dimple groups 62 are arranged to be different from each other in Embodiment 3, which is different from Embodiment 1. Other configurations are the same as those of Embodiment 1. Hereinafter, the same members and configurations as those of Embodiment 1 will be denoted by the same reference numerals, and redundant description thereof will be omitted.

As shown in FIG. 4, the sliding surface S of the fixed-side sealing ring 5 is provided with a plurality of the clockwise dimple groups 61 and 62 in which dimples 19 and 20 are arranged in the clockwise direction from the inner diameter side to the outer diameter side of the sliding surface S, and a plurality of counterclockwise dimple groups 59 and 60 in which the dimples 19 and 20 are arranged in the counterclockwise direction from the inner diameter side to the outer diameter side of the sliding surface S.

As shown in FIG. 4, the clockwise dimple group 61 is arranged such that the long axis L of each dimple 19 is in contact with an imaginary spiral SP9, and a predetermined number (6 in the example of FIG. 4) of the dimples 19 are arranged at equal intervals along the spiral SP9 in the clockwise direction from the inner diameter side to the outer diameter side of the sliding surface S. The clockwise dimple group 62 is arranged such that the short axis K of each dimple 20 is in contact with an imaginary spiral SP10 extending in the clockwise direction from the inner diameter side to the outer diameter side of the sliding surface S. The counterclockwise dimple group 59 is arranged such that the long axis L of each dimple 20 is in contact with an imaginary spiral SP12, and a predetermined number (4 in the example of FIG. 4) of the dimples 20 are arranged along the spiral SP12 in the counterclockwise direction from the inner diameter side to the outer diameter side of the sliding surface S. The counterclockwise dimple group 60 is arranged such that the short axis K of each dimple 19 is in contact with an imaginary spiral SP11 extending in the clockwise direction from the inner diameter side to the outer diameter side of the sliding surface S. On the sliding surface S, three consecutive dimple groups 61, one dimple group 62, one dimple group 61, and one dimple group 62 are arranged in this order in the circumferential direction.

When the rotation-side sealing ring 3 rotates in the clockwise direction, the clockwise dimple groups 61 and 62 exhibit a sealing function and a fluid lubricating function, and thus leakage and sliding torque may be reduced. On the other hand, when the rotation-side sealing ring 3 rotates in the counterclockwise direction, the dimple groups 59 and 60 extending in the counterclockwise direction exhibit the sealing function and the fluid lubricating function, and thus leakage and sliding torque may be reduced. However, since the number of the clockwise dimple groups 61 is larger, the sealing function and the fluid lubricating function may be improved during clockwise rotation as compared with counterclockwise rotation.

According to the sliding component of Embodiment 1, the same number of the clockwise dimple groups 51 and the clockwise dimple groups 53 are alternately arranged in the circumferential direction. In contrast, the sliding component of Embodiment 3 is arranged with a larger number of the clockwise dimple groups 61, which is effective in a case where clockwise rotation is frequent.

Embodiment 4

Figure 5:
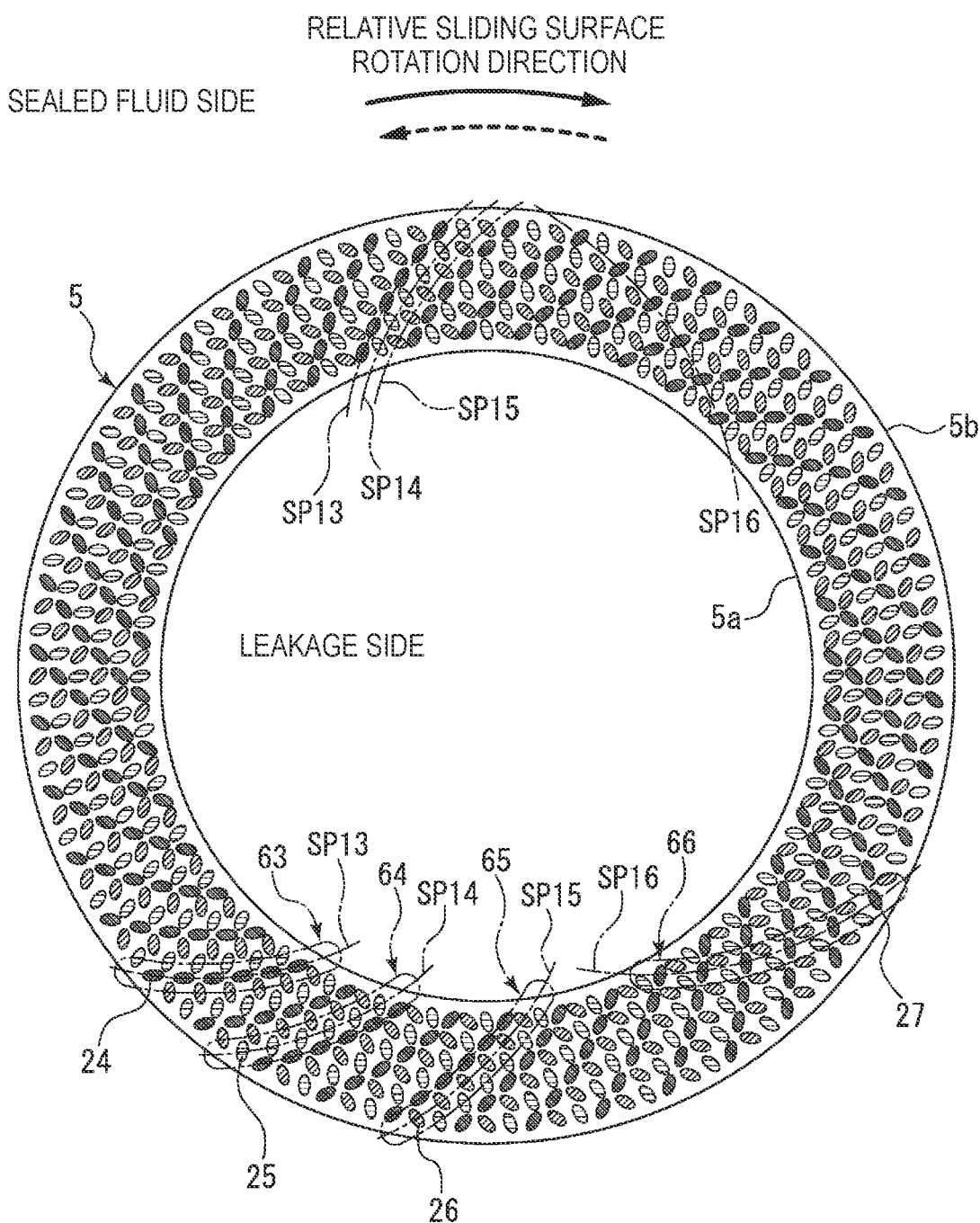
FIG. 5 is taken along line W-W of FIG. 1, which shows an example of a sliding surface of a sliding component according to Embodiment 4 of the present invention.
Figure 6A:
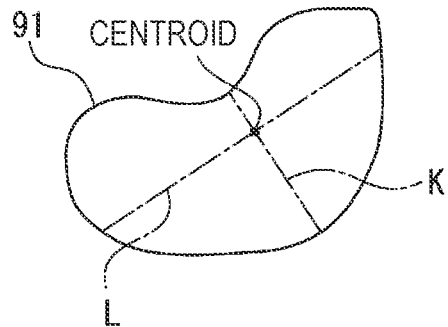
FIGS. 6A to 6D show other embodiments of a dimple of the present invention.
Figure 6B:
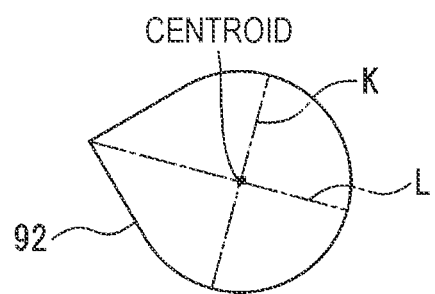
Figure 6C:
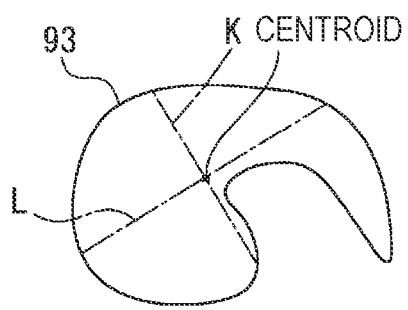
Figure 6D:
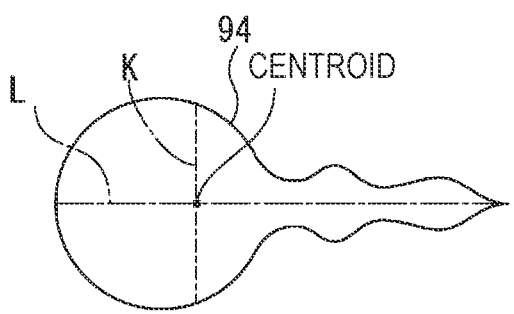

A sliding component according to Embodiment 4 of the present invention will be described. FIG. 5 shows the sliding surface S of a sliding component according to Embodiment 4 which is different in that clockwise dimple groups 63, 64, and 65 arranged adjacent to each other are constituted by different dimples 24, 25, and 26. Hereinafter, the same members and configurations as those of Embodiment 1 will be denoted by the same reference numerals, and redundant description thereof will be omitted.

As shown in FIG. 5, the sliding surface S of the fixed-side sealing ring 5 is provided with a plurality of the clockwise dimple groups 63, 64 and 65 in which the dimples 24, 25 and 26 are arranged in the clockwise direction from the inner diameter side to the outer diameter side of the sliding surface S, and a plurality of counterclockwise dimple groups 66 in which the dimples 24 are arranged in the counterclockwise direction from the inner diameter side to the outer diameter side of the sliding surface S. The dimples 24, 25, and 26 are different from each other in at least one of size, depth, and dimple angle, and characteristics of the respective dimples are different from each other. The dimple angle refers to an angle formed by a radial axis, which passes through an intersection of the long axis L and the short axis K, and the long axis L.

As shown in FIG. 5, the clockwise dimple group 63 is arranged such that the long axis L of each dimple 24 is arranged at a predetermined angle along an imaginary spiral SP13, and a predetermined number (6 in the example of FIG. 5) of the dimples 24 are arranged at equal intervals along the spiral SP13 in the clockwise direction from the inner diameter side to the outer diameter side of the sliding surface S. The clockwise dimple group 64 is arranged such that the short axis K of each dimple 25 is arranged at a predetermined angle along a spiral SP14 extending in the clockwise direction from the inner diameter side to the outer diameter side of the sliding surface S. The clockwise dimple group 65 is arranged such that the short axis K of each dimple 26 is arranged at a predetermined angle along an imaginary spiral SP15 extending in the clockwise direction from the inner diameter side to the outer diameter side of the sliding surface S. The counterclockwise dimple group 66 is arranged such that the short axes of dimples 27 are arranged each at a predetermined angle along an imaginary spiral SP16 extending in the counterclockwise direction from the inner diameter side to the outer diameter side of the sliding surface S. The clockwise dimple groups 65, 63, and 64 are arranged in this order in the circumferential direction. Here, although the dimples 24 constituting the clockwise dimple group 63, the dimples 25 constituting the clockwise dimple group 64, and the dimples 26 constituting the clockwise dimple group 65 have the same shape, arrangement angles of the dimples relative to the long axes L or the short axes K are different. As a result, sealing performance efficiency and lubricating performance efficiency of the clockwise dimple groups 63, 64 and 65 may be arranged to be highest each at different rotation speed. That is, since the clockwise dimple groups 63, 64, and 65 exhibit a favorable sealing function and a fluid lubricating function each at different rotation speed, the mechanical seal 1 may exhibit favorable sealing function and fluid lubricating function even when used in a wide rotation speed range.

Although the embodiments of the present invention have been described above with reference to the drawings, the specific configuration is not limited to these embodiments, and changes and additions without departing from the spirit of the present invention are also included in the present invention.

Although the outer peripheral side is the sealed fluid side while the inner peripheral side is the leakage side in the above embodiment, the present invention is not limited thereto, and the present invention is also applicable to a case where the inner peripheral side is the sealed fluid side while the outer peripheral side is the leakage side. In addition, although each dimple group is formed by arranging the long axis or the short axis of each dimple along the spirals, the present invention is not limited thereto. For example, each dimple may be arranged along a curve such as a parabola, a trochoid curve, or a sine curve so as to form the dimple group.

REFERENCE SIGNS LIST

1: mechanical seal
2: sleeve
3: rotation-side sealing ring
4: housing
5: fixed-side sealing ring
5a: leakage-side peripheral edge
6: coiled wave spring
7: bellows
8: packing
9: casing
10: rotation shaft
11: dimple
11a: opening portion
12: dimple
12a: opening portion
15: dimple
16: dimple
21: dimple
22: dimple
24: dimple
25: dimple
26: dimple
51: clockwise dimple group (first dimple group)
52: counterclockwise dimple group (second dimple group)
53: clockwise dimple group (third dimple group)
54: counterclockwise dimple group (fourth dimple group)
55: clockwise dimple group
56: clockwise dimple group
57: counterclockwise dimple group
58: counterclockwise dimple group
59: counterclockwise dimple group
60: counterclockwise dimple group
61: clockwise dimple group
62: clockwise dimple group
63: clockwise dimple group
64: clockwise dimple group
65: clockwise dimple group
66: counterclockwise dimple group
91: closed curve
92: closed curve
93: closed curve
94: closed curve
K: short axis
L: long axis
R: land portion
S: sliding surface
S: dimple sliding surface
θ: dimple angle
θ1: angle
θ2: angle

The invention claimed is:

1. A sliding component comprising a pair of sliding members being slidable relative to each other on sliding surfaces of the sliding members,
    wherein at least one of the sliding surfaces includes a dimple group in which a plurality of dimples is arranged, each of the dimples having an opening portion a shape of which has a long axis and a short axis orthogonal to the long axis,
    the dimple group includes:
        a clockwise dimple group in which the dimples are arranged in a clockwise direction from an inner diameter side to an outer diameter side of the one of the sliding surfaces; and
        a counterclockwise dimple group in which the dimples are arranged in a counterclockwise direction from the inner diameter side to the outer diameter side of the one of the sliding surfaces,
    the clockwise dimple group includes a first dimple group in which the long axes of the dimples are aligned, and the counterclockwise dimple group includes a second dimple group in which the long axes of the dimples are aligned, and
    the clockwise dimple group includes a third dimple group in which the short axes of the dimples constituting the second dimple group are aligned, and the counterclockwise dimple group includes a fourth dimple group in which the short axes of the dimples constituting the first dimple group are aligned.

2. The sliding component according to claim 1, wherein the dimples constituting the first dimple group and the dimples constituting the second dimple group have different depths.

3. The sliding component according to claim 1, wherein the first dimple group forms a curve that is convex outward in a radial direction of the sliding surface.

4. The sliding component according to claim 1, wherein the second dimple group forms a curve that is convex outward in the radial direction of the sliding surface.

5. The sliding component according to claim 1, wherein the dimple group is formed by arranging the long axis or the short axis of the dimple along a predetermined curve.

6. The sliding component according to claim 5, wherein the predetermined curve is formed in a spiral shape.

7. The sliding component according to claim 1, wherein the shape of each of the opening portions of the dimples is an ellipse.

8. The sliding component according to claim 1, wherein the first dimple group forms a curve that is convex in a sliding direction of the sliding surfaces.

9. The sliding component according to claim 1, wherein the second dimple group forms a curve that is convex in a sliding direction of the sliding surfaces.

\* \* \* \* \*